(12) United States Patent
Kim et al.

(10) Patent No.: US 11,994,763 B2
(45) Date of Patent: May 28, 2024

(54) DISPLAY PANEL AND METHOD OF PROVIDING THE SAME

(71) Applicant: Samsung Display Co., LTD., Yongin-si (KR)

(72) Inventors: Young Gu Kim, Yongin-si (KR); Baekkyun Jeon, Yongin-si (KR); Jiyun Park, Hwaseong-si (KR); Jongho Son, Seoul (KR); Hyelim Jang, Hwaseong-si (KR); Kyungseon Tak, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 376 days.

(21) Appl. No.: 16/951,183

(22) Filed: Nov. 18, 2020

(65) Prior Publication Data

US 2021/0247645 A1   Aug. 12, 2021

(30) Foreign Application Priority Data

Feb. 6, 2020  (KR) .......................... 10-2020-0014503

(51) Int. Cl.
    *G02F 1/1335*    (2006.01)
    *G02B 5/30*      (2006.01)

(52) U.S. Cl.
    CPC ..... *G02F 1/133526* (2013.01); *G02B 5/3058* (2013.01); *G02F 1/133504* (2013.01); *G02F 1/133528* (2013.01); *G02F 1/133548* (2021.01)

(58) Field of Classification Search
    None
    See application file for complete search history.

(56) References Cited

U.S. PATENT DOCUMENTS

| | | | |
|---|---|---|---|
| 9,507,059 B2 | 11/2016 | Shim et al. | |
| 2008/0284949 A1* | 11/2008 | Matsumori | G02B 5/3016 349/194 |
| 2009/0009704 A1* | 1/2009 | Tomikawa | G02F 1/134363 349/167 |
| 2015/0043221 A1* | 2/2015 | Lee | G02B 5/0273 362/311.06 |
| 2016/0187682 A1 | 6/2016 | Oh et al. | |
| 2016/0252665 A1* | 9/2016 | Lee | G02B 1/14 359/489.07 |
| 2018/0059301 A1* | 3/2018 | An | G02F 1/133528 |
| 2019/0121194 A1* | 4/2019 | Park | G02F 1/133526 |
| 2020/0073172 A1* | 3/2020 | Wee | G02F 1/133528 |
| 2020/0379292 A1* | 12/2020 | Tak | G02B 5/0215 |

FOREIGN PATENT DOCUMENTS

| | | | |
|---|---|---|---|
| KR | 101640718 B1 | 7/2016 | |
| KR | 101802628 B1 | 11/2017 | |
| KR | 1020190044712 A | 5/2019 | |
| KR | 1020190087030 A | 7/2019 | |

* cited by examiner

Primary Examiner — Phu Vu
(74) Attorney, Agent, or Firm — CANTOR COLBURN LLP

(57) ABSTRACT

A display panel includes a first base layer, a second base layer facing the first base layer, and in order between the first base layer and the second base layer, from the first base layer: an image display layer which provides light, a polarization layer which receives the light from the image display layer and transmits a polarized component of the light toward the second base layer, and a lens layer.

17 Claims, 12 Drawing Sheets ced apart from each other along a second
DISPLAY PANEL AND METHOD OF PROVIDING THE SAME This application claims priority to Korean Patent Application No. 10-2020-0014503 filed on Feb. 6, 2020, and all the benefits accruing therefrom under 35 U.S.C. § 119, the disclosure of which is hereby incorporated by reference in its entirety.

BACKGROUND

(1) Field

The invention relates to a display panel and a method of fabricating the same. More particularly, the invention relates to a display panel with improved visibility and low process cost, and a method of fabricating the same.

(2) Description of the Related Art

Various types of display devices have been used to provide image information. Since a liquid crystal display device has advantages such as low power consumption, the liquid crystal display device is used for large-sized display devices, portable display devices, etc. In the liquid crystal display device, various optical members are added to a backlight unit to increase optical efficiency and color reproducibility.

SUMMARY

Embodiments of the invention provide a display panel with improved visibility due to a polarization layer and an optical layer included within the display panel.

Embodiments of the invention provide a method of providing a display panel, in which a polarization layer and an optical layer are provided within the display panel to simplify manufacturing processes and to reduce costs.

According to embodiments, a display panel includes: a first base layer, a second base layer facing the first base layer, and in order between the first base layer and the second base layer, from the first base layer: an image display layer which provides light, a polarization layer which receives the light from the image display layer and transmits a polarized component of the light toward the second base layer, and a lens layer.

In an embodiment, the polarization layer may include a wire-grid polarizer.

In an embodiment, the lens layer may include: a lower refractive layer including a plurality of protrusions protruding in an upward direction; and an upper refractive layer having a refractive index different from a refractive index of the lower refractive layer. The upper refractive layer may be on the lower refractive layer and may cover a top surface of the lower refractive layer.

In an embodiment, each of the plurality of protrusions may have a rectangular shape in cross-section.

In an embodiment, each of the plurality of protrusions may have a trapezoidal shape in cross-section.

In an embodiment, each of the plurality of protrusions may have a thickness of about 10 micrometers (μm) to about 100 μm along the upward direction.

In an embodiment, each of the plurality of protrusions may include a top surface and a bottom surface. A width of each of the top surface and the bottom surface may be about 10 μm to about 60 μm.

In an embodiment, a distance between bottom surfaces of adjacent protrusions among the plurality of protrusions may be about 5 μm to about 30 μm.

In an embodiment, the polarization layer may include a plurality of wire-grid patterns extending along a first direction and spaced apart from each other along a second direction intersecting the first direction.

In an embodiment, the plurality of protrusions may extend along the second direction and may be spaced apart from each other along the first direction.

In an embodiment, a refractive index of the lower refractive layer may be equal to or greater than about 1.55 and less than about 1.75. A refractive index of the upper refractive layer may be equal to or greater than about 1.20 and less than about 1.55.

In an embodiment, the image display layer may include: a first electrode on the first base layer; and a second electrode which faces the first electrode and is between the first electrode and the second base layer. The image display layer may emit light in a direction from the first electrode toward the second electrode.

In an embodiment, the display panel may further include a low-refractive layer on the second base layer.

According to embodiments, a display panel includes: an image display layer which provides light; a polarization layer including a plurality of nano-patterns extending along a first direction and spaced apart from each other along a second direction intersecting the first direction; and a lens layer including a plurality of protrusions extending along the second direction and spaced apart from each other along the first direction.

In an embodiment, the image display layer may emit the light in a light-emitting direction, and the polarization layer and the lens layer may be in order from the image display layer, in the light-emitting direction.

In an embodiment, the lens layer may include: a lower refractive layer including the plurality of protrusions; and an upper refractive layer covering the lower refractive layer and having a refractive index less than a refractive index of the lower refractive layer.

According to embodiments, a method of providing a display panel includes: providing an image display layer on a first base layer; providing a polarization layer facing the first base layer with the image display layer therebetween; and providing a lens layer facing the image display layer with the polarization layer therebetween.

In an embodiment, the providing the lens layer may include providing in order from the first base layer: a lower refractive layer including a plurality of protrusions protruding in an upward direction; and an upper refractive layer covering the lower refractive layer. The upper refractive layer may have a refractive index less than a refractive index of the lower refractive layer.

In an embodiment, the providing the polarization layer may include providing a plurality of nano-patterns extending along a first direction and spaced apart from each other along a second direction intersecting the first direction. The plurality of protrusions of the lens layer may extend along the second direction and may be spaced apart from each other along the first direction.

In an embodiment, the providing the lens layer may include providing a second base layer on the lens layer. The lens layer and the polarization layer may be between the first base layer and the second base layer.

BRIEF DESCRIPTION OF THE DRAWINGS

The above and other advantages and features of this disclosure will become more apparent by describing in further detail embodiments thereof with reference to the accompanying drawings, in which.

DETAILED DESCRIPTION

Figure 1:
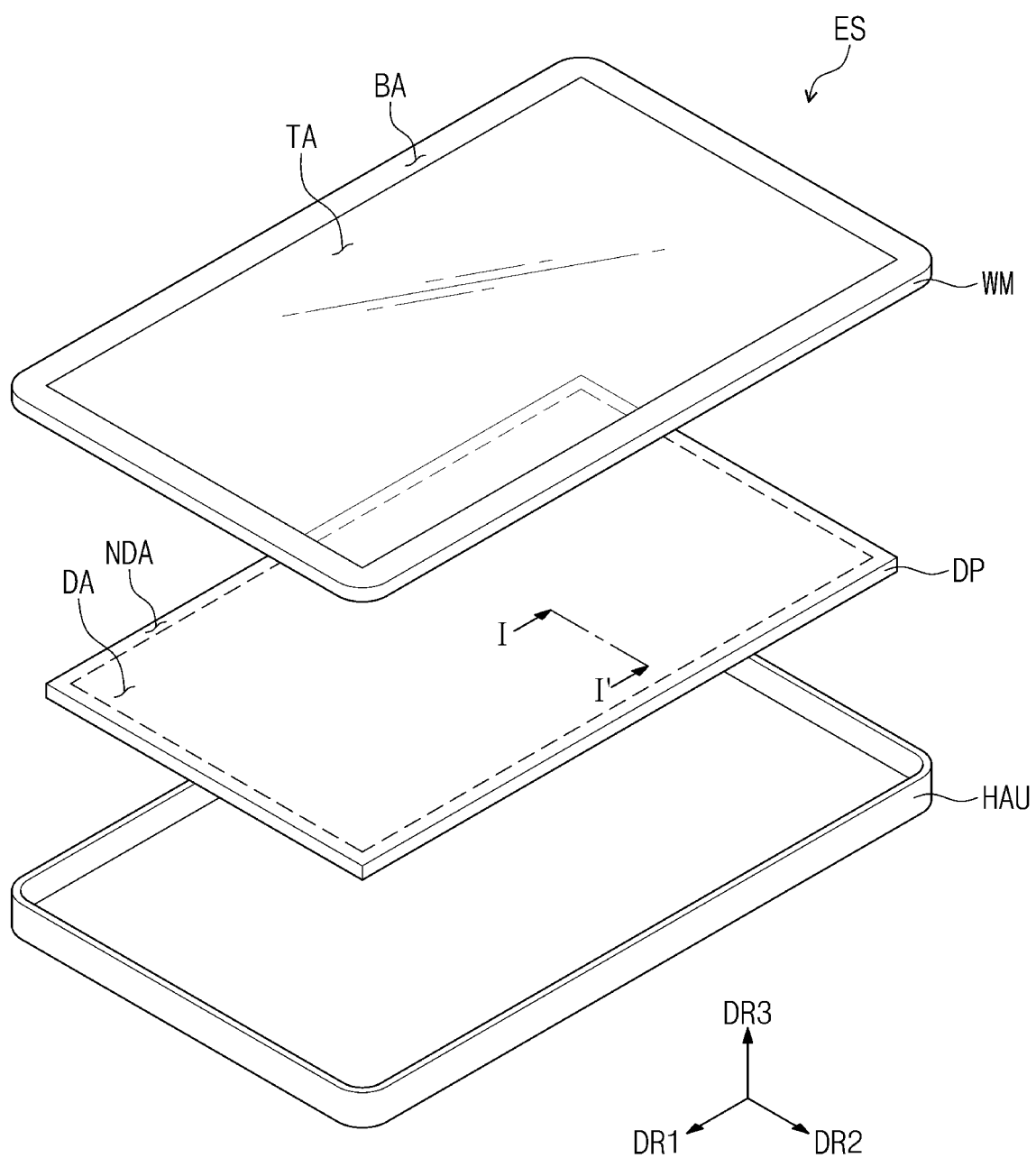
FIG. 1 illustrates an exploded perspective view of an embodiment of a display device.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

The following will now describe embodiments of the invention in conjunction with the accompanying drawings. In this description, when a component (or region, layer, portion, etc.) is referred to as being related to another element such as being "on," "connected to" or "coupled to" other component(s), the component may be directly disposed on, directly connected to or directly coupled to the other component(s) or at least one intervening component may be present therebetween. In contrast, when a component (or region, layer, portion, etc.) is referred to as being related to another element such as being "directly on," "directly connected to" or "directly coupled to" other component(s), no intervening component is present therebetween.

Like numerals indicate like components. Moreover, in the drawings, thicknesses, ratios, and dimensions of components are exaggerated for effectively explaining the technical contents.

The terminology used herein is for the purpose of describing particular embodiments only and is not intended to be limiting. As used herein, "a", "an," "the" and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." The term "and/or" includes one or more combinations defined by associated components.

It will be understood that, although the terms first, second, etc. may be used herein to describe various components, these components should not be limited by these terms. These terms are only used to distinguish one component from another component. For example, a first component could be termed a second component, and vice versa without departing from the scope of the invention. Unless the context clearly indicates otherwise, the singular forms are intended to include the plural forms as well.

In addition, the terms "beneath," "lower," "above," "upper" and the like are used herein to describe one component's relationship to other component(s) illustrated in the drawings. The relative terms are intended to encompass different orientations in addition to the orientation depicted in the drawings.

It should be understood that the terms "comprise," "include," "have" and the like are used to specify the presence of stated features, integers, steps, operations, components, elements, or combinations thereof, but do not preclude the presence or addition of one or more other features, integers, steps, operations, components, elements, or combinations thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In this description, the phrase "a component B is directly disposed on a component A" means that neither an adhesive layer (e.g., intervening member) nor an adhesive member is disposed between the component A and the component B.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A display device having a relatively small thickness and excellent optical characteristics is increasingly demanded. However, when various optical members are added such as to improve display quality of the display device, minimizing a total thickness of the display device is limited.

The following will now describe a display panel according to embodiments of the invention in conjunction with the accompanying drawings.

Figure 2:
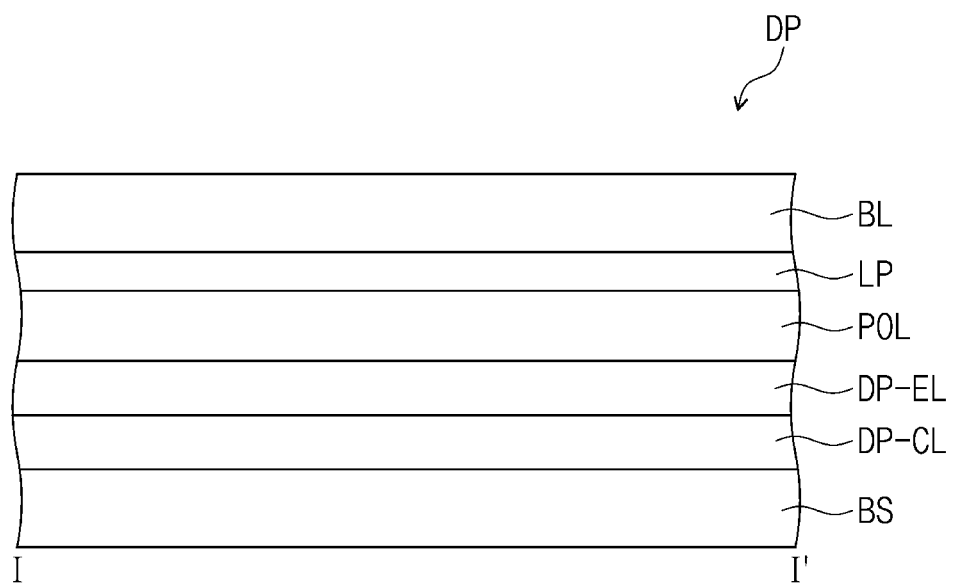
FIG. 2 illustrates a cross-sectional view of an embodiment of a display panel.
Figure 2:
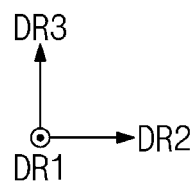

FIG. 1 illustrates an exploded perspective view of an embodiment of a display device ES. FIG. 2 illustrates a cross-sectional view of an embodiment of a display panel DP of a display device ES. FIG. 2 is a cross-section taken along line I-I' of FIG. 1.

A display device ES may be a large-sized display apparatus for televisions, display monitors and outdoor billboards. In addition, the display device ES may be a small-sized and medium-sized display apparatus for personal computers, laptop computers, personal digital terminals, automotive navigation units, game consoles, smart phones, tablet computers and cameras. These items are merely presented as examples, and the display device ES may be adopted for other display apparatuses without departing from the scope and spirit of the invention.

The display device ES may include a window WM (e.g., window member), a display panel DP and a housing HAU. The display panel DP may include a display element, such as a liquid crystal layer or an organic light emitting display element, for generating and/or displaying images, generating and/or emitting light, etc. Although not shown, the display device ES may include various functional elements which are activated by electrical signals, such as a touch element or a detection element, other than the display element.

FIG. 1 shows first, second and third directions DR1, DR2 and DR3. Throughout this description, directions indicated by the first to third directions DR1 to DR3 are relative concepts and may thus be changed to other directions.

In this description, the third direction DR3 is defined to indicate a direction along which an image is provided and/or light is emitted to outside the display device ES. In addition, the first direction DR1 and the second direction DR2 may intersect each other, and the third direction DR3 may be a normal direction to a plane defined by the first direction DR1 and the second direction DR2. A thickness of the display device ES and various components thereof, may be defined along the third direction DR3. In FIG. 1, an image may be provided on a display surface or display screen in a plane which is parallel to a plane defined by the first direction DR1 and the second direction DR2.

For the display device ES, the window WM may be disposed on the display panel DP, that is, in the direction along which an image is provided to outside the display device ES. The window WM may include a material including glass, sapphire or plastic. The window WM may form an outer surface of the display device ES, without being limited thereto.

The window WM includes a transmission region TA through which an image provided from the display panel DP is transmitted to outside the display device ES. The window WM also includes a shield region BA which is adjacent to the transmission region TA and through which no image passes. Differently from that shown in FIG. 1, the window WM may be omitted from the display device ES.

For the display device ES, the display panel DP may be disposed below the window WM.

The display panel DP may be a non-emissive display panel. In an embodiment, the display panel DP may be a liquid crystal display panel. The display panel DP may generate and/or display an image by using light provided from a backlight unit (not shown). When the display panel DP is a liquid crystal display panel, the display panel DP may include a liquid crystal layer as a display element. However, the invention is not limited thereto, and the display panel DP may be an emissive display panel (e.g., light emissive panel). In an embodiment, for example, the display panel DP may be a light emitting diode ("LED") display panel, an organic electroluminescence display panel or a quantum-dot light emitting display panel. The light emitting diode ("LED") display panel may include a light emitting diode as a display element, an emission layer EML within a display element of the organic electroluminescence display panel may include an organic electroluminescent material, and an emission layer EML within a display element of the quantum-dot light emitting display panel may include a quantum-dot or a quantum-rod.

In a top plan view (e.g., along a direction opposite to the third direction DR3), the display panel DP displays an image at a surface that is defined as a display surface. The display surface includes a display region DA at which an image is displayed, and a non-display region NDA which is adjacent to the display region DA and at which no image is displayed. In the top plan view, the display region DA may be defined at a center of the display panel DP, and may overlap or correspond to the transmission region TA of the window WM.

The housing HAU may be disposed below and accommodate the display panel DP. The housing HAU may cover the display panel DP except for the display surface, so as to expose the display surface or a top surface of the display panel DP which is furthest along the third direction DR3, to outside the housing HAU. The housing HAU may expose an entirety of the top surface of the display panel DP, while covering lateral and bottom surfaces of the display panel DP.

Although not shown, the display device ES may include a driver chip, a tape carrier package on which the driver chip is mounted, and a printed circuit board that is electrically connected through the tape carrier package to the display panel DP.

Referring to FIG. 2, the display panel DP includes a first base layer BS, a circuit layer DP-CL disposed on the first base layer BS, a display layer DP-EL disposed on the circuit layer DP-CL, a polarization layer POL disposed on the display layer DP-EL, a lens layer LP disposed on the polarization layer POL, and a second base layer BL disposed on the lens layer LP. A low-refractive layer (not shown) may further be disposed on the second base layer BL. In embodiments, the first base layer BS, the circuit layer DP-CL, the display layer DP-EL, the polarization layer POL, the lens layer LP, and the second base layer BL may be sequentially stacked in order along the third direction DR3.

The display layer DP-EL and/or the circuit layer DP-CL may be referred to as an image display layer. That is, in an embodiment, the display panel DP may include in order between the first base layer BS and the second base layer BL, from the first base layer BS, an image display layer which provides light, a polarization layer POL which receives the light from the image display layer and transmits a polarized component of the light toward the second base layer, and a lens layer LP. The image display layer provides light in a light-emitting direction (e.g., third direction DR3), and the polarization layer POL and the lens layer LP are in order from the image display layer, in the light-emitting direction.

The first base layer BS may be a member that provides a base surface on which the display layer DP-EL is disposed. The first base layer BS may be a glass substrate, a metal substrate or a plastic substrate. However, embodiments of the invention are not limited thereto, and the first base layer BS may be an inorganic material layer, an organic material layer or a composite material layer.

In embodiments, the circuit layer DP-CL may be provided on the first base layer BS, and may include a plurality of transistors (not shown). The transistors (not shown) may each include a control electrode, an input electrode and an output electrode. In an embodiment, for example, the circuit layer DP-CL may include a driving transistor and a switching transistor for driving electrodes or display elements included in the display layer DP-EL.

The display layer DP-EL may generate images, emit light, etc. in response to driving signals or control signals (e.g., electrical signals) received from the circuit layer DP-CL. In embodiments, when the display panel DP is a liquid crystal display panel, the display layer DP-EL may include a liquid crystal layer. Alternatively, when the display panel DP is an organic electroluminescence display panel, the display layer DP-EL may include an emission layer EML including an organic light emitting material within a display element.

The polarization layer POL may be disposed on the display layer DP-EL and may polarize a component of light provided from the display layer DP-EL. The polarization layer POL may have a first transmission axis (not shown) in a first direction. In an embodiment, for example, when the polarization layer POL is provided with light from the display layer DP-EL, the polarization layer POL may transmit only a polarized light component parallel to the first transmission axis. The polarization layer POL may be an in-cell polarization member disposed within the display panel DP.

The lens layer LP is disposed on the polarization layer POL. When the lens layer LP is provided with light from the display layer DP-EL, the lens layer LP serves to refract the light in a direction different from an upward direction or in the third direction DR3. The lens layer LP may be disposed on the display layer DP-EL and may refract the light provided from the display layer DP-EL in a lateral direction inclined to the upward direction, which may result in an improvement in side visibility. A lateral direction may be defined having a component along the first base layer BS, such as along the first direction DR1 or the second direction DR2. In embodiments, the lens layer LP may have a configuration in which a plurality of layers having different refractive indices from each other are combined with each other.

The second base layer BL is disposed on the lens layer LP. The second base layer BL may be disposed above the first base layer BS (e.g., in the direction along which an image is provided to outside the display device ES), and may be a member that faces the first base layer BS with other layers of the display panel DP therebetween. The second base layer BL may be a member that provides a base surface on which are disposed the polarization layer POL and the lens layer LP. The second base layer BL may be a glass substrate, a metal substrate or a plastic substrate. However, embodiments of the invention are not limited thereto, and the second base layer BL may be an inorganic material layer, an organic material layer or a composite material layer.

The display panel DP according to embodiments of the invention includes the display layer DP-EL, the polarization layer POL and the lens layer LP that are disposed between the first base layer BS and the second base layer BL facing each other. In an embodiment, for example, the display layer DP-EL, the polarization layer POL and the lens layer LP may be embedded within the display panel DP to be between base layers which face each other. This configuration may improve side visibility of the display panel DP and may also obviate a lens layer on the second base layer BL, for improvement of side visibility of the display panel DP, which may result in a simplification of fabrication process and a reduction in fabrication cost.

Although not shown, the display panel DP may further include an adhesive member between the polarization layer POL and the lens layer LP, and between the second base layer BL and the lens layer LP. The adhesive member may include an adhesive material. The adhesive member may include an optically clear adhesive ("OCA") or a pressure sensitive adhesive ("PSA"). Alternatively, no adhesive layer may be provided between components, such that the lens layer LP may be directly on the polarization layer POL, and the second base layer BL may be directly on the lens layer LP.

A low-refractive layer (not shown) may further be disposed on the second base layer BL. In an embodiment, the display panel DP includes a low-refractive layer facing the lens layer LP with the second base layer BL therebetween. Since the low-refractive layer has a refractive index less than that of the second base layer BL, when light travels along an upward direction from the bottom to the top of the second base layer BL (e.g., in the third direction DR3), a total reflection may effectively occur at an interface between the low-refractive layer and the second base layer BL. The total reflection may result in an increase in extraction efficiency of the light that travels in the upward direction.

Figure 3A:
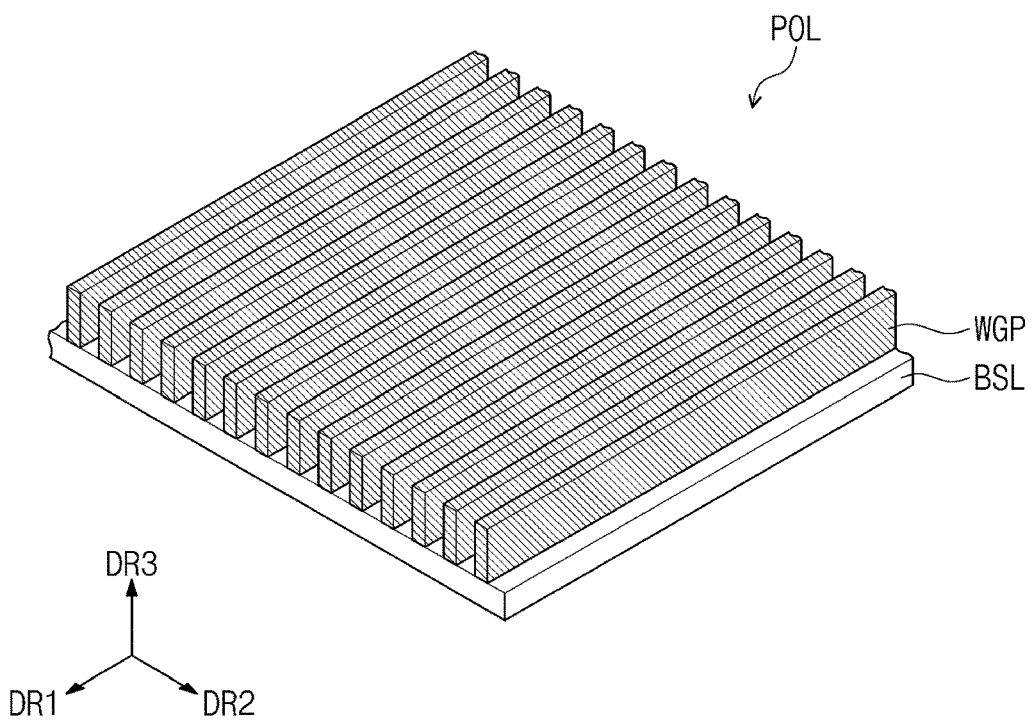
FIG. 3A illustrates a perspective view of an embodiment of a polarization layer of a display panel.
Figure 3B:
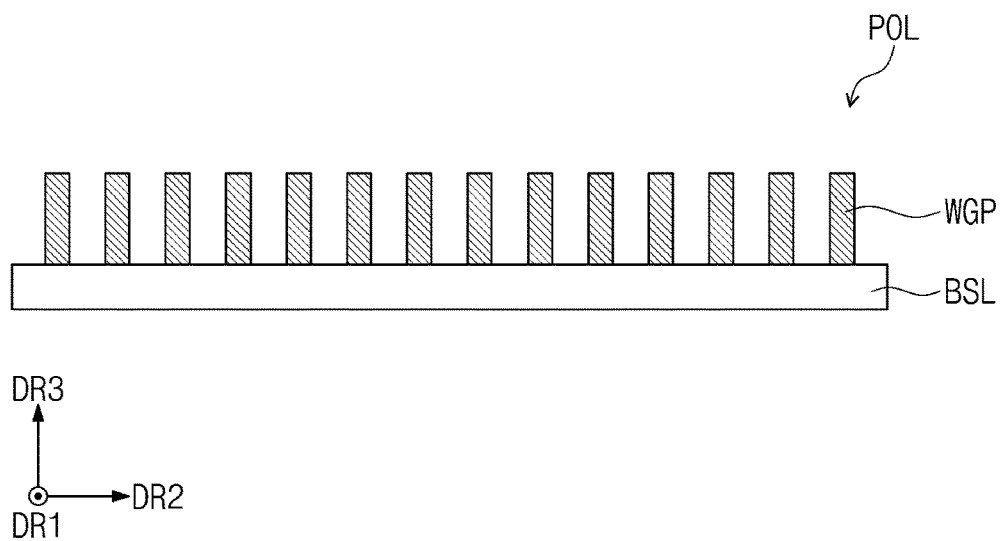
FIG. 3B illustrates a cross-sectional view of an embodiment of a polarization layer of a display panel.

FIG. 3A illustrates a perspective view and FIG. 3B illustrates a cross-sectional view of an embodiment of a polarization layer POL of a display panel DP. The polarization layer POL may be in-cell polarization member included in a display panel DP.

Referring to FIGS. 3A and 3B, the polarization layer POL may be a wire-grid polarizer. The polarization layer POL may include a third base layer BSL and a wire-grid pattern WGP which is provided in plurality (e.g., a plurality of wire-grid patterns WGP) on the third base layer BSL.

The third base layer BSL may include an optically transparent material, for example, a silicon substrate. The third base layer BSL may be a member that provides a base surface on which the plurality of wire-grid patterns WGP are disposed. The third base layer BSL may include an inorganic material layer, an organic material layer or a composite material layer. In embodiments, the third base layer BSL may be omitted.

The plurality of wire-grid patterns WGP may respectively extend along the first direction DR1, and may be spaced apart from each other along the second direction DR2 that intersects the first direction DR1. The plurality of wire-grid patterns WGP may have plate shapes that are elongated along the first direction DR1 and are spaced apart along the second direction DR2 at an interval. The plurality of wire-grid patterns WGP may each have a nano-scale width along the second direction DR2, and a nano-scale interval may be provided between the wire-grid patterns WGP adjacent to each other along the second direction DR2. The plurality of wire-grid patterns WGP may be referred to as a plurality of nano-patterns. The display panel DP may include the plurality of nano-patterns extending along a first direction DR1 and spaced apart from each other along a second direction DR2 intersecting the first direction DR1.

Each of the plurality of wire-grid patterns WGP may include metal. In embodiments, each of the plurality of wire-grid patterns WGP may include aluminum.

The polarization layer POL may polarize light that is incident through the plurality of wire-grid patterns WGP. In an embodiment, for example, when light is incident on the wire-grid patterns WGP, metallic properties of the wire-grid patterns WGP may reflect an S-wave that is a polarized light component parallel to the first direction DR1 or the extending direction of the wire-grid patterns WGP, and may transmit a P-wave that is a polarized light component parallel to the second direction DR2 perpendicular to the extending direction of the wire-grid patterns WGP and is recognized as an effective refractive medium.

Figure 4A:
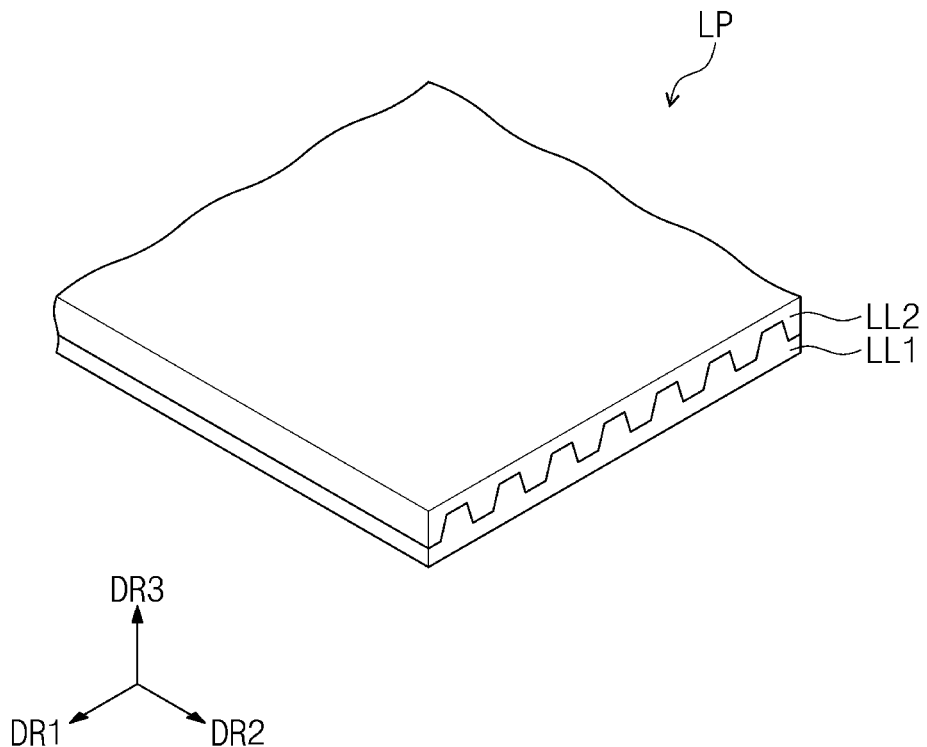
FIG. 4A illustrates a perspective view of an embodiment of a lens layer of a display panel.
Figure 4B:
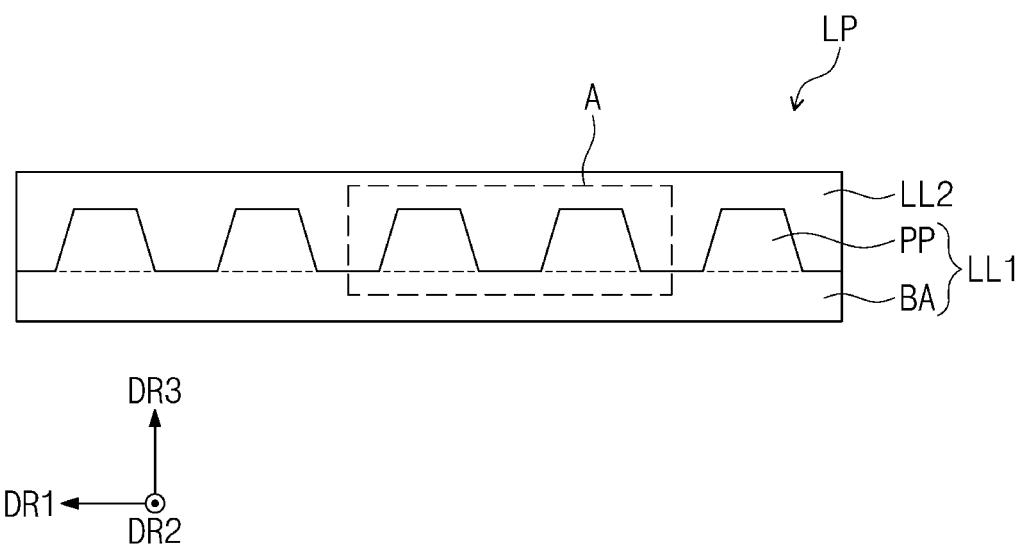
FIGS. 4B and 4C illustrate cross-sectional views of embodiments of a lens layer of a display panel.
Figure 4C:
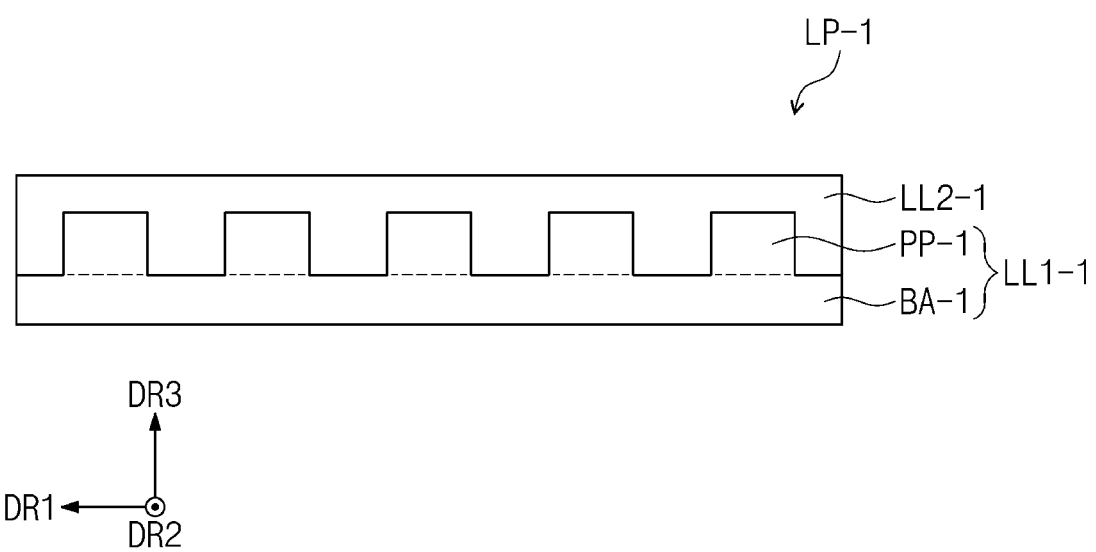

FIG. 4A illustrates a perspective view and FIGS. 4B and 4C illustrate cross-sectional views of embodiments of a lens layer LP of a display panel DP.

Referring to FIGS. 4A and 4B, the lens layer LP has a configuration in which layers having different refractive indices from each other, are combined with each other. The lens layer LP includes a lower refractive layer LL1 (e.g., first refractive layer) and an upper refractive layer LL2 (e.g., second refractive layer). The upper refractive layer LL2 may be disposed on and combined with the lower refractive layer LL1. In an embodiment, the lens layer LP includes in order from the first base layer BS to the second base layer BL, a lower refractive layer LL1 having a refractive index and including a plurality of protrusions PP protruding toward the second base layer BL (e.g., in a direction away from the first base layer BS), and an upper refractive layer LL2 having a refractive index different from the refractive index of the lower refractive layer LL1 and covering the lower refractive layer LL1.

The lower refractive layer LL1 and the upper refractive layer LL2 have refractive indices different from each other. In embodiments, the lower refractive layer LL1 may have a refractive index greater than that of the upper refractive layer LL2. In an embodiment, for example, the lower refractive layer LL1 may have a refractive index of equal to or greater than about 1.55 and less than about 1.75. The upper refractive layer LL2 may have a refractive index of equal to or greater than about 1.20 and less than about 1.55.

The lower refractive layer LL1 may include a bottom layer BA and a protrusion PP provided in plurality (e.g., a plurality of protrusions PP) that protrude from the bottom layer BA. That is, the bottom layer BA is common to each other plurality of protrusions PP and defines a common plane (dotted line in FIG. 4B) from which the plurality of protrusions PP are extended. The plurality of protrusions PP may be disposed on the bottom layer BA, and may each have a shape that protrudes along the third direction DR3.

The upper refractive layer LL2 may have a shape or profile that corresponds to that of the plurality of protrusions PP included in the lower refractive layer LL1, and may be combined with the lower refractive layer LL1. The upper refractive layer LL2 may cover a top surface of the lower refractive layer LL1. The upper refractive layer LL2 may cover top and lateral surfaces of the plurality of protrusions PP included in the lower refractive layer LL1, and may also cover exposed regions of the bottom layer BA between the plurality of protrusions PP.

Referring to FIG. 4C, the lens layer LP-1 has a configuration in which layers having different refractive indices from each other, are combined with each other. The lens layer LP-1 includes a lower refractive layer LL11 (e.g., first refractive layer) and an upper refractive layer LL2-1 (e.g., second refractive layer). The upper refractive layer LL2-1 may be disposed on and combined with the lower refractive layer LL1-1. The lower refractive layer LL1-1 may include a bottom layer BA-1 and a protrusion PP-1 provided in plurality (e.g., a plurality of protrusions PP-1) that protrude from the bottom layer BA-1. That is, the bottom layer BA-1 is common to each of the plurality of protrusions PP-1 and defines a common plane (dotted line in FIG. 4C) from which the plurality of protrusions PP-1 are extended. The plurality of protrusions PP-1 may be disposed on the bottom layer BA-1, and may each have a shape that protrudes along the third direction DR3.

Each of the plurality of protrusions PP may have a trapezoidal shape (see FIGS. 4A and 4B) in cross-section. Alternatively, in embodiments, each of the plurality of protrusions PP may have a rectangular shape (see FIG. 4C) in cross-section. Each of the plurality of protrusions PP may have but not limited to a cross-sectional shape as long as such shape can increase side visibility by allowing light incident on the lens layer LP to undergo refraction at an interface between the lower refractive layer LL1 and the upper refractive layer LL2.

The plurality of protrusions PP may be spaced apart from each other along the first direction DR1 and are elongated along the second direction DR2 which intersects the first direction DR1. In an embodiment, for example, each of the plurality of protrusions PP may have a shape that is elongated along the second direction DR2 intersecting the first direction DR1 as the extending direction of the plurality of wire-grid patterns WGP (see FIG. 3A) included in the polarization layer POL (see FIG. 3A). Since polarized light passing through the polarization layer POL includes a polarized light component parallel to a direction that intersects the extending direction of the wire-grid pattern WGP, when the plurality of wire-grid patterns WGP are elongated intersecting the plurality of protrusions PP included in the lens layer LP, the plurality of protrusions PP may refract light polarized by the lens layer LP and thus may improve visibility.

Figure 5:
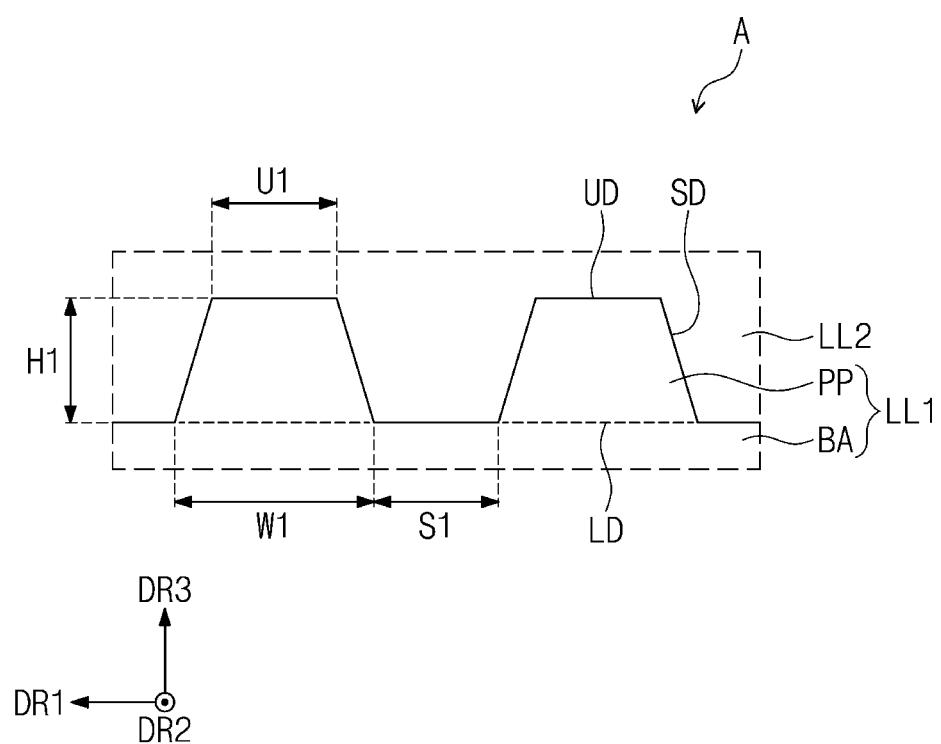
FIG. 5 illustrates an enlarged cross-sectional view of an embodiment of section A of FIG. 4B.

FIG. 5 illustrates an enlarged cross-sectional view of an embodiment of section A of FIG. 4B. FIG. 5 focuses on the plurality of protrusions PP included in the lower refractive layer LL1 depicted in FIG. 4B.

Referring to FIG. 5, each of the plurality of protrusions PP may have a trapezoidal shape in cross-section, and may include a top surface UD furthest from the bottom layer BA, a bottom surface LD closest to or common with the bottom layer BA, and a lateral surface SD that connects the top surface UD to the bottom surface LD. The top surface UD and the bottom surface LD may face each other, and may have a plate shape. The bottom surface LD may be coplanar with the common plane defined by the bottom layer BA. The lateral surface SD may be an inclined surface that connects the top and bottom surfaces UD and LD to each other.

Each of the plurality of protrusions PP may have a thickness H1 (e.g., height) along an upward direction or the third direction DR3 (e.g., in a direction from the first base layer BS to the second base layer BL). The thickness H1 may range from about 10 micrometers (μm) to about 100 μm. The top surface UD of each of the plurality of protrusions PP may have an upper width U1 along the second direction DR2, and the upper width U1 may range from about 10 μm to about 60 μm. That is, each of the upper width U1 of the top surface UD and the lower width W1 of the bottom surface LD may range from about 10 μm to about 60 μm. The bottom surface LD of each of the plurality of protrusions PP may have a lower width W1 along the second direction DR2, and the lower width W1 may range from about 10 μm to about 60 μm. In an embodiment, each of the plurality of protrusions PP includes a top surface UD furthest from the first base layer BS and having an upper width U1 along the first base layer BS, and a bottom surface LD closest to the first base layer BS and having a lower width W1 along the first base layer BS.

The plurality of protrusions PP may be separated from each other at the lower width W1 by an interval distance S1 (e.g., distance) along the second direction DR2, and the interval distance S1 may range from about 5 μm to about 30 μm. In an embodiment, adjacent protrusions among the plurality of protrusions PP include bottom surfaces spaced apart from each other by a distance, and the distance between the bottom surfaces of the adjacent protrusions may range from about 5 µm to about 30 µm. Since the plurality of protrusions PP has the thickness H1, the upper width U1, the lower width W1 and the interval distance S1 that satisfy the ranges described above, the lens layer LP including the plurality of protrusions PP may be provided or formed through photolithography and may serve to improve side visibility by refracting light provided from the display layer DP-EL (see FIG. 2).

Table 1 below lists simulation results of visibility, contrast ratio and brightness that are obtained from embodiments of a display panel DP to which is applied a lens layer LP including protrusion patterns that satisfy the ranges described above, and from a comparative example of a comparative display panel to which is applied a film-type lens.

In Table 1, Embodiment 1 shows results obtained from protrusion patterns of a lens layer LP each have a thickness H1 of about 8 µm, an upper width U1 of about 3 µm, a lower width W1 of about 5 µm, and an interval distance S1 of about 2 µm. Embodiment 2 shows results obtained from protrusion patterns of a lens layer LP each have a thickness H1 of about 4 µm, an upper width U1 of about 1.5 µm, a lower width W1 of about 2.5 µm, and an interval distance S1 of about 1 µm. Comparative 1 shows results obtained from protrusion patterns of a comparative lens film each having a thickness H1 of about 16 an upper width U1 of about 6 µm, a lower width W1 of about 10 µm, and an interval distance S1 of about 4 µm.

TABLE 1

| Classification | Comparative 1 | Embodiment 1 | Embodiment 2 |
| --- | --- | --- | --- |
| Visibility (GDI) | 0.15 | 0.15 | 0.15 |
| Contrast Ratio (CR) | 2490 | 2490 | 2490 |
| White Brightness (nit) | 349 | 349 | 349 |
| Black Brightness (nit) | 0.14 | 0.14 | 0.14 |

Referring to the results in Table 1, since one or more embodiment of the lens layer LP includes the protrusion patterns that satisfy the range described above, the lens layer LP may have visibility (graphics display interface, "GDI"), contrast ratio ("CR"), and brightness that are improved to the same degree as that of the conventional film-type lens. Since one or more embodiment of the lens layer LP includes the protrusion pattern whose scale is about half or quarter that of the conventional film-type lens, it may be ascertained that the display panel DP includes therein the protrusion patterns formed by photolithography.

Figure 6:
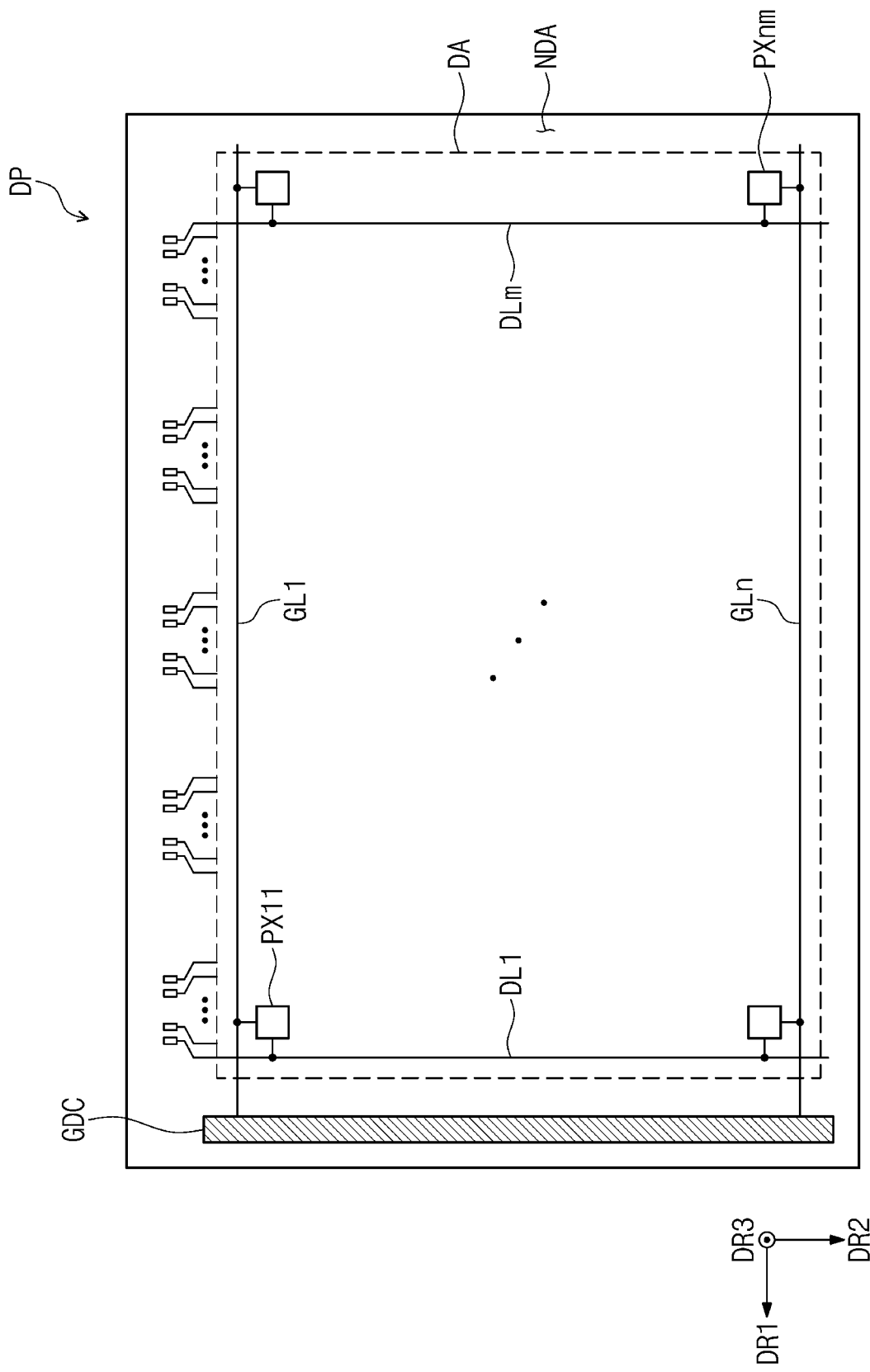
FIG. 6 illustrates a top plan view of an embodiment of a display panel.

FIG. 6 illustrates a top plan view of an embodiment of a display panel DP. FIG. 6 shows a planar arrangement relationship between pixels PX11 to PXnm and signal lines GL1 to GLn and DL1 to DLm. The signal lines GL1 to GLn and DL1 to DLm may include a plurality of gate lines GL1 to GLn and a plurality of data lines DL1 to DLm.

Each of the pixels PX11 to PXnm is connected to a corresponding one of the plurality of gate lines GL1 to GLn and to a corresponding one of the plurality of data lines DL1 to DLm. Each of the pixels PX11 to PXnm may include a pixel driver circuit and an emission member (e.g., light emission layer or image emission layer). Based on the configuration of the pixel driver circuit, the display panel DP may further include various signal lines.

The pixels PX11 to PXnm may be disposed in a matrix shape, but are not limited thereto. The pixels PX11 to PXnm may be disposed in a pentile shape. The pixels PX11 to PXnm may be disposed in a diamond shape.

A gate driver circuit GDC may be disposed in the non-display region NDA. The gate driver circuit GDC may be integrated on the display panel DP such as through an oxide silicon gate driver circuit ("OSG") process or an amorphous silicon gate driver circuit ("ASG") process.

Figure 7A:
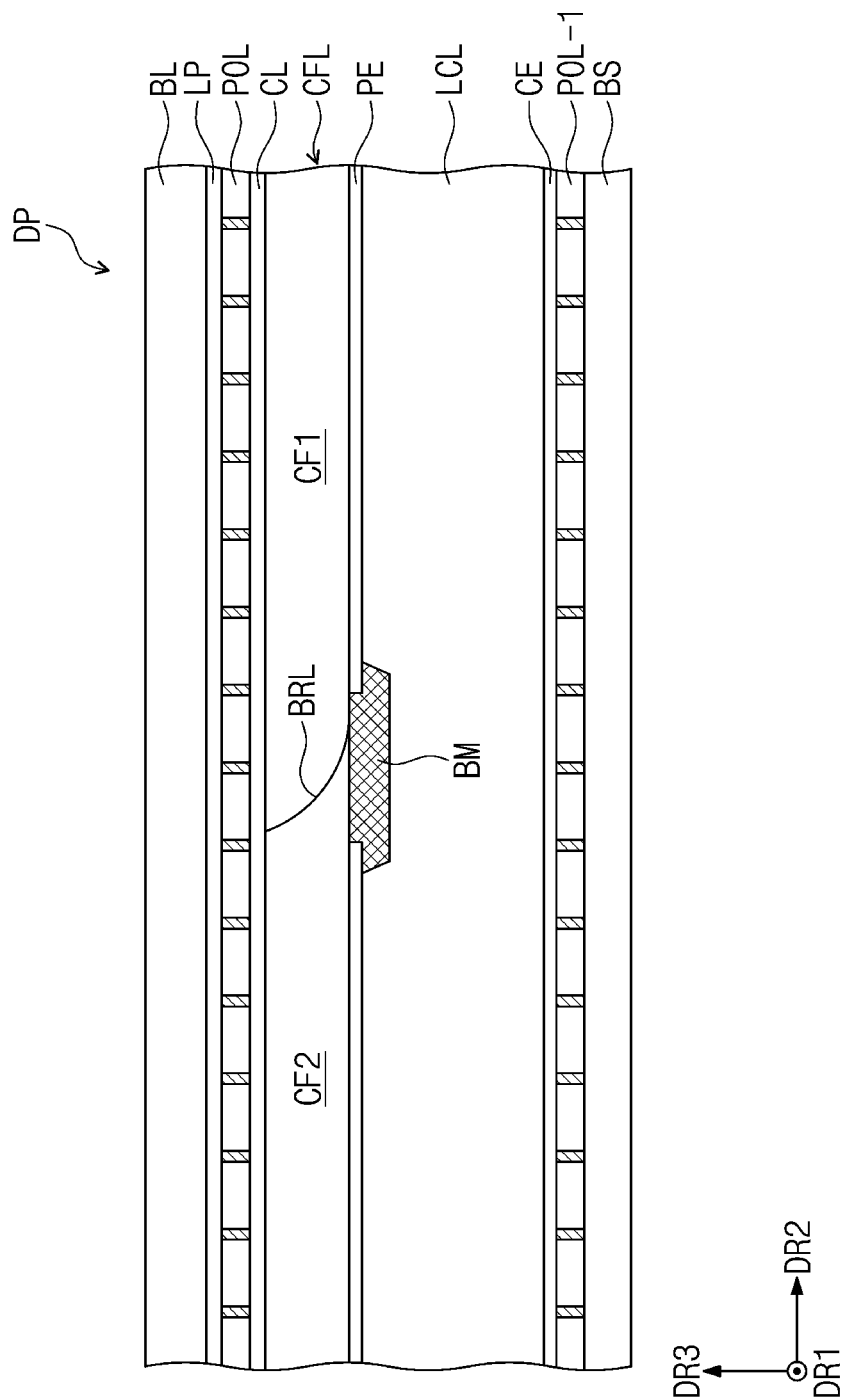
FIGS. 7A and 7B illustrate cross-sectional views of embodiments of a display panel.
Figure 7B:
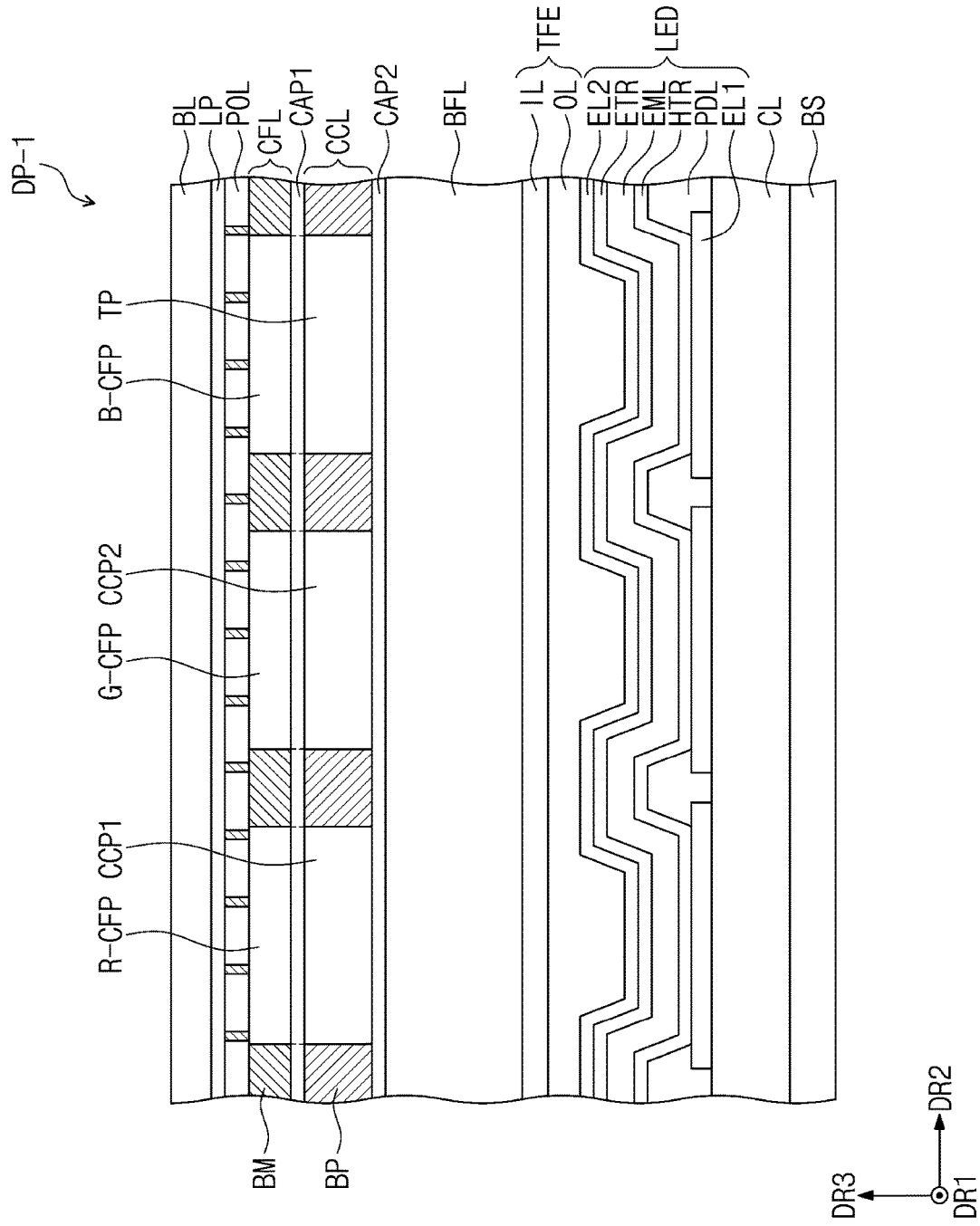

FIGS. 7A and 7B illustrate cross-sectional views of embodiments of a display panel DP. FIG. 7A shows an example in which a liquid crystal display panel is adopted as a display panel DP. FIG. 7B shows an example in which an organic light emitting display panel is adopted as a display panel DP-1. In the following embodiments shown in FIGS. 7A and 7B, the same configurations as those discussed above are allocated the same reference symbols, and a detailed description thereof will be omitted. In the embodiments that follow, the description about the polarization layer POL, the lens layer LP, the first base layer BS and the second base layer BL may hold true for a polarization layer POL as an upper polarization layer, a lens layer LP, a first base layer BS and a second base layer BL.

Referring to FIG. 7A, a display panel DP may include a first base layer BS and a second base layer BL that face each other, and may also include a liquid crystal layer LCL disposed between the first base layer BS and the second base layer BL that face each other. A lower polarization layer POL-1, a common electrode CE, a pixel electrode PE, a color filter layer CFL, a circuit layer CL, an upper polarization layer (e.g., polarization layer POL) and a lens layer LP may further be disposed between the first base layer BS and the second base layer BL. In addition, an alignment layer (not shown) may further be included to arrange liquid crystal molecules of the liquid crystal layer LCL.

The lower polarization layer POL-1 may be disposed on the first base layer BS of the display panel DP. The lower polarization layer POL-1 may be an in-cell type polarizer disposed between the first base layer BS and the liquid crystal layer LCL. The lower polarization layer POL-1 may be either a coating-type polarization layer or a deposition-type polarization layer formed by deposition. The lower polarization layer POL-1 may be provided or formed by coating a material that includes a dichroic dye and a liquid crystal material. Alternatively, the lower polarization layer POL-1 may be a wire-grid type polarizer. However, the invention is not limited thereto, and the lower polarization layer POL-1 may be provided in the form of a polarization film disposed below the first base layer BS.

The common electrode CE may be provided on the first base layer BS. The common electrode CE and the pixel electrode PE that is formed on the second base layer BL, may together generate an electric field to control the liquid crystal layer LCL. The common electrode CE may include or be formed of a transparent conductive material. The common electrode CE may include or be formed of, for example, conductive metal oxide such as indium tin oxide ("ITO"), indium zinc oxide ("IZO"), or indium tin zinc oxide ("ITZO"). An alignment layer (not shown) may be disposed on the common electrode CE.

The pixel electrode PE may be disposed to face the common electrode CE with the liquid crystal layer LCL therebetween. The pixel electrode PE may be between the liquid crystal layer LCL and the color filter layer CFL. The pixel electrode PE includes or is formed of a transparent conductive material. In an embodiment, for example, the pixel electrode PE includes or is formed of transparent conductive oxide. The transparent conductive oxide may be indium tin oxide ("ITO"), indium zinc oxide ("IZO"), indium tin zinc oxide ("ITZO"), or the like.

The color filter layer CFL may include a plurality of filters CF1 and CF2 that transmit light having different wavelength ranges from each other. A light shield pattern BM may further be disposed between neighboring ones of the plurality of filters CF1 and CF2. The light shield pattern BM may be disposed to overlap a boundary BRL between neighboring ones of the plurality of filters CF1 and CF2.

The circuit layer CL may include a thin film transistor including a gate electrode, a gate dielectric layer, a semiconductor pattern, a source electrode and a drain electrode. The thin film transistor may be connected to the pixel electrode PE.

Although not shown, when a liquid crystal display panel is adopted as the display panel DP, a backlight unit may be disposed below the display panel DP. The backlight unit may include a light source that generates light and a light guide plate that guides a propagation direction of the light. The light source may be disposed on one side of the light guide plate, and the light guide plate may guide light to allow the light generated from the light source to travel toward the display panel DP.

Referring to FIG. 7B, a display panel DP-1 may include a circuit layer CL disposed on a first base layer BS, a light emitting element layer LED disposed on the circuit layer CL, an encapsulation member TFE disposed on the light emitting element layer LED, and a filling layer BFL disposed on the encapsulation member TFE. In addition, the display panel DP-1 may include a second base layer BL, and may also include a lens layer LP, an upper polarization layer (e.g., polarization layer POL), a color filter layer CFL, and a light control layer CCL that are sequentially disposed below the second base layer BL.

In an embodiment, the light emitting element layer LED of the display panel DP-1 may include a plurality of light emitting elements, each of which overlaps a pixel region and has a first electrode EL1, a hole transport region HTR, an emission layer EML, an electron transport region ETR, and a second electrode EL2 that are sequentially stacked. The pixel region may be a planar area at which light is emitted and/or an image is displayed. A peripheral region may be a planar area at which light is not emitted and/or an image is not displayed. In an embodiment, the pixel region and the peripheral region may be in a pixel described above.

The emission layer EML may have a unitary shape, may be disposed in common on a plurality of pixel regions and may extend to the peripheral region. The emission layer EML may generate a first light. In an embodiment, for example, the emission layer EML may produce a blue light. Although not shown, the light emitting elements may each have an emission layer EML that overlaps the pixel region and does not overlap the peripheral region. Here, the light emitting elements that correspond to the pixel regions may generate light having different colors from each other.

The encapsulation member TFE is disposed on and encapsulates the light emitting element layer LED. The encapsulation member TFE may include an inorganic layer IL disposed at an outermost position (e.g., furthest from the first base layer BS). The encapsulation member TFE may further include an organic layer OL, or may have a structure in which a plurality of the inorganic layer IL and the organic layer OL are alternately and repeatedly provided. The encapsulation member TFE may protect the light emitting element layer LED against moisture, oxygen and foreign substances such as dust particles.

In an embodiment, the inorganic layer IL may include but is not limited to a material as long as the material can protect the underlying light emitting element layer LED. In an embodiment, for example, the inorganic layer IL may include silicon nitride (SiNx). The organic layer OL may include an acrylate-based organic material, but the invention is not limited thereto. The inorganic layer IL may be provided or formed by deposition, and the organic layer OL may be provided or formed by deposition or coating.

FIG. 7B shows an example in which the encapsulation member TFE includes one organic layer OL and one of the inorganic layer IL, but the encapsulation member TFE may include a plurality of the organic layer OL and a plurality of the inorganic layer IL. In an embodiment, for example, the encapsulation member TFE may have a configuration in which two of the inorganic layer IL are disposed facing each other across one of the organic layer OL.

The light control layer CCL may be included in the display panel DP-1. The light control layer CCL may be disposed on the light emitting element layer LED. The light control layer CCL may be disposed on a plurality of light emitting elements, and may face the encapsulation member TFE across the filling layer BFL.

The light control layer CCL may include a transmission part TP (e.g., transmission pattern) that allows the first light to pass therethrough, a first optical conversion part CCP1 (e.g., first optical conversion pattern) that converts the first light into a second light, and a second optical conversion part CCP2 (e.g., second optical conversion pattern) that converts the first light into a third light. In an embodiment, for example, the second light may be a red light and the third light may be a green light.

The first optical conversion part CCP1 and the second optical conversion part CCP2 may each include a luminous substance. The luminous substance may be a particle that changes a wavelength of light incident to the pattern. In embodiments, the luminous substance included in the first and second optical conversion parts CCP1 and CCP2 may be a quantum dot.

The light control layer CCL may include a base resin and a luminous substance. The light control layer CCL may further include a scattering particle which scatters light. The luminous substance and the scattering particle may be included in each of the first optical conversion part CCP1, the second optical conversion part CCP2 and the transmission part TP of the light control layer CCL. However, the invention is not limited thereto, and the luminous substance and the scattering particle may be included in a portion of the light control layer CCL.

As discussed above, the light control layer CCL may include the first optical conversion part CCP1, the second optical conversion part CCP2 and the transmission part TP. The first optical conversion part CCP1, the second optical conversion part CCP2, and the transmission part TP may be disposed spaced apart from each other in the plan view and in a direction along the first base layer BS.

A planar area may be defined as a product of a dimension along the first direction DR1 and a dimension along the second direction DR2. FIG. 7B represents that the first optical conversion part CCP1, the second optical conversion part CCP2 and the transmission part TP have the same planar area and/or the same thickness as each other, but are not limited thereto and may have different planar areas and/or different thicknesses.

A partition BP may be disposed between the first optical conversion part CCP1 and the second optical conversion part CCP2, and between the second optical conversion part CCP2 and the transmission part TP. In the top plan view, the partition BP may overlap the peripheral region. The partition BP may reduce or effectively prevent light leakage, and may differentiate boundaries between the first optical conversion part CCP1, the second optical conversion part CCP2 and the transmission part TP. The partition BP may include an organic light shield material and may include a black pigment or dye as a light blocking material.

The color filter layer CFL may be disposed on the light control layer CCL. The color filter layer CF1 may include a light shield pattern BM, a first color filter R-CFP, a second color filter G-CFP and a third color filter B-CFP.

The first color filter R-CFP, the second color filter G-CFP and the third color filter B-CFP may be disposed spaced apart from each other in the top plan view. The first color filter R-CFP may be disposed to correspond to the first optical conversion part CCP1, and may shield the first light and the third light while allowing the first light to pass therethrough. The second color filter G-CFP may be disposed to correspond to the second optical conversion part CCP2, and may shield the first light and the second light while allowing the third light to pass therethrough. The third color filter B-CFP may be disposed to correspond to the transmission part TP, and may shield the second light and the third light while allowing the first light to pass therethrough. The first color filter R-CFP may include a red-colored material, the second color filter G-CFP may include a green-colored material, and the third color filter B-CFP may include a blue-colored material. Since the display panel DP-1 includes the color filter layer CFL, the display panel DP-1 may effectively reduce external light reflection and may reduce or effectively prevent color mixing.

The light shield pattern BM may be provided to correspond to the peripheral region. The light shield pattern BM may include or be formed of an organic or inorganic light shield material, such as including a black pigment or dye. In an embodiment, the light shield pattern BM may be included in the color filter layer CFL or the light shield pattern BM may be omitted.

The filling layer BFL may be disposed between the encapsulation member TFE and the light control layer CCL. Since the filling layer BFL is disposed between the encapsulation member TFE and the light control layer CCL, the filling layer BFL may reduce or effectively prevent the light control layer CCL from contacting the encapsulation member TFE and may increase light extraction efficiency of the display panel DP-1.

The filling layer BFL may fill a gap defined between the encapsulation member TFE and the light control layer CCL. The phrase "the filling layer BFL may fill a gap between the encapsulation member TFE and the light control layer CCL" may mean that the filling layer BFL may be in contact with the encapsulation member TFE and the light control layer CCL so as to leave no inner space between the encapsulation member TFE and the light control layer CCL. As being in contact, elements may form an interface therebetween. The filling layer BFL may reduce or effectively prevent luminous substances and/or scattering particles included in the light control layer CCL from being oxidized due to air. Accordingly, the display panel DP-1 may maintain light extraction efficiency. However, in an embodiment, the filling layer BFL may be omitted from the display panel DP-1. Here, an air layer may be provided or formed between the encapsulation member TFE and the light control layer CCL. The filling layer BFL may include an inorganic binder, an organic binder or a liquid crystal material.

A first capping layer CAP1 and a second capping layer CAP2 may be included in the display panel DP-1. The first capping layer CAP1 and the second capping layer CAP2 may each be disposed between the light control layer CCL and the filling layer BFL, and/or between the light control layer CCL and the color filter layer CFL. In an embodiment, for example, the first capping layer CAP1 may be on a top surface of the light control layer CCL or between the light control layer CCL and the color filter layer CFL, and the second capping layer CAP2 may be on a bottom surface of the light control layer CCL or between the light control layer CCL and the filling layer BFL. The first capping layer CAP1 and the second capping layer CAP2 may include or be formed of an inorganic material. The first capping layer CAP1 and the second capping layer CAP2 may be disposed to surround and protect the light control layer CCL.

The following will discuss a method of fabricating a display panel DP.

FIGS. 8A to 8F illustrate cross-sectional views of an embodiment of a method of fabricating a display panel DP. In explaining the following method of fabricating a display panel DP with reference to FIGS. 8A to 8F, the same components as those discussed above are allocated the same reference symbols, and a detailed description thereof will be omitted.

Referring to FIGS. 8A to 8F, a method of fabricating a display panel DP includes providing or forming a display layer DP-EL on a first base layer BS, providing or forming an in-cell polarization layer (e.g., polarization layer POL) on the display layer DP-EL, and performing a photolithography process to provide or form a lens layer LP on the polarization layer POL.

Figure 8A:
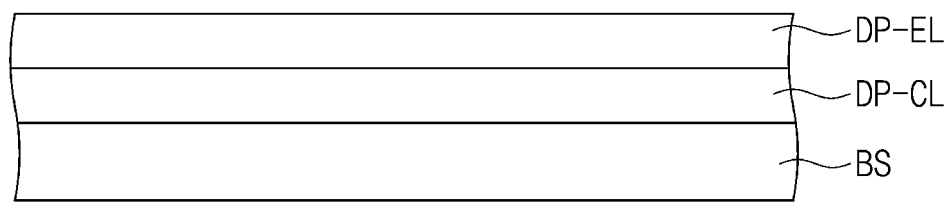
FIGS. 8A to 8F illustrate cross-sectional views of processes of an embodiment of a method of providing a display panel.
Figure 8A:
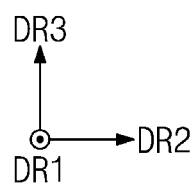

Referring to FIG. 8A, in the display panel fabrication method, a circuit layer DP-CL and the display layer DP-EL may be sequentially provided or formed on the first base layer BS. The first base layer BS may provide a base surface on which are provided or formed the circuit layer DP-CL and the display layer DP-EL. Based on a type of display panel DP, the circuit layer DP-CL and the display layer DP-EL may be appropriately selected.

Figure 8B:
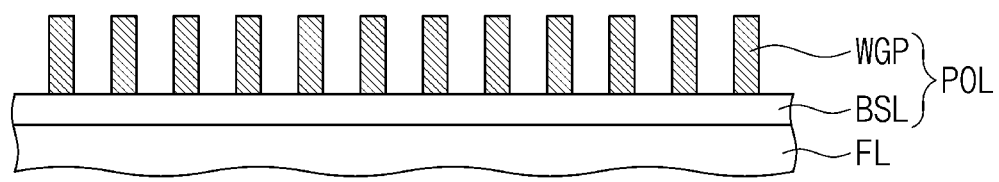
Figure 8B:
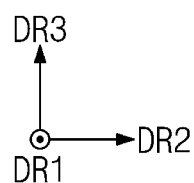

Referring to FIG. 8B, the display panel fabrication method includes providing or forming the polarization layer POL. The polarization layer POL may be provided or formed on a first foundation layer FL. The first foundation layer FL may provide a base surface on which the polarization layer POL is provided or formed. In an embodiment, the first foundation layer FL may be an uppermost layer included in the display layer DP-EL of the display panel DP. Alternatively, the first foundation layer FL on which the polarization layer POL is provided or formed may be a layer included in the lens layer LP of the display panel DP.

The polarization layer POL may include a third base layer BSL and a plurality of wire-grid patterns WGP which are provided or formed on the third base layer BSL. The plurality of wire-grid patterns WGP may be provided or formed by depositing a metallic material layer such as an aluminum layer, and then patterning the metallic material layer to provide the wire-grid patterns WGP having a nano-scale interval therebetween. The polarization layer POL may be provided or formed to include the plurality of wire-grid patterns WGP and the third base layer BSL may be omitted. In an embodiment, for example, the plurality of wire-grid patterns WGP may be directly provided or formed on the first foundation layer FL that provides the base surface. The plurality of wire-grid patterns WGP may be provided or formed elongated along the first direction DR1, while being spaced apart from each other along the second direction DR2.

Figure 8C:
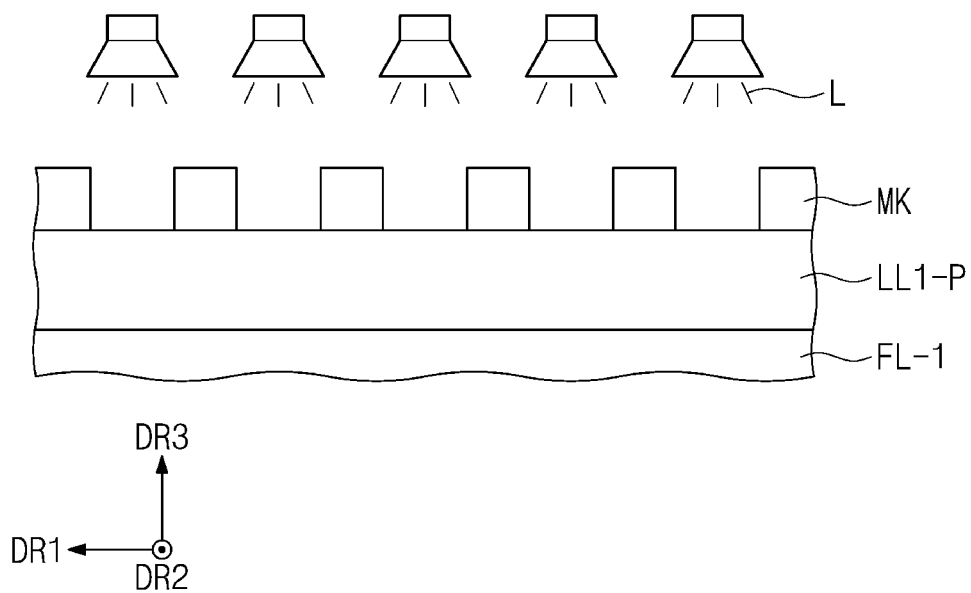

Referring to FIG. 8C, the display panel fabrication method includes providing or forming the lens layer LP. The lens layer LP may be provided or formed on a second foundation layer FL-1. The second foundation layer FL-1 may provide a base surface on which the lens layer LP is provided or formed. In an embodiment, for example, the second foundation layer FL-1 may be the polarization layer POL of the display panel DP. Alternatively, the second foundation layer FL-1 on which the lens layer LP is provided or formed may be a second base layer BL of the display panel DP.

Figure 8D:
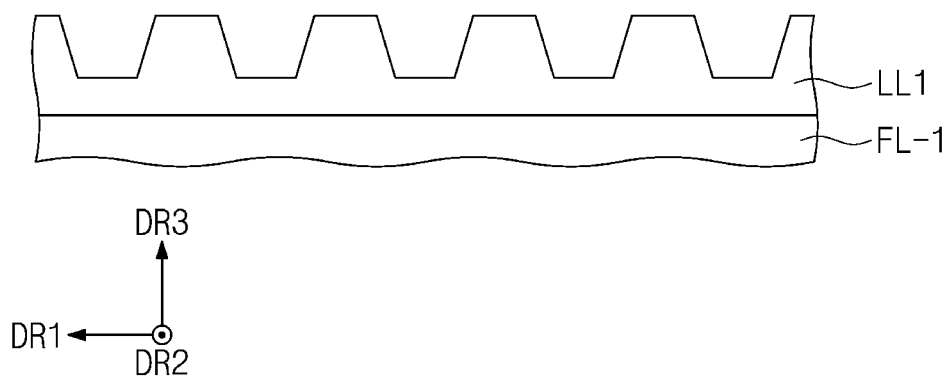
Figure 8E:
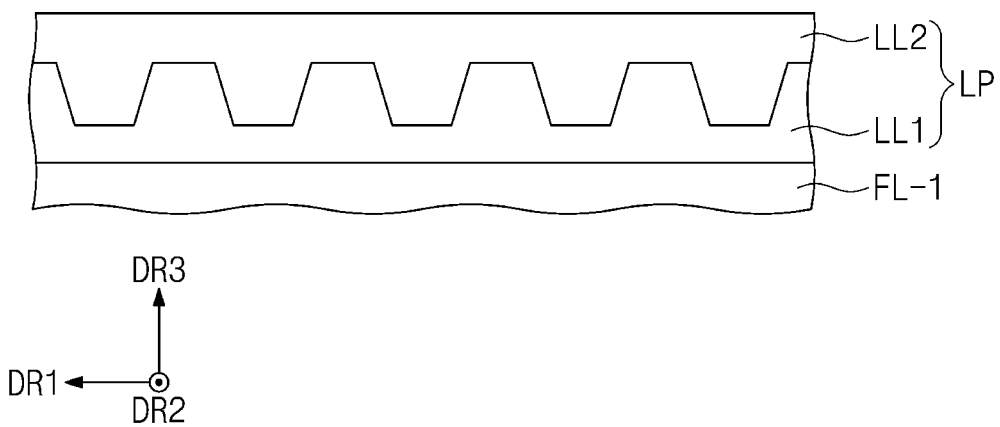

FIGS. 8C to 8E show an embodiment in which a lower refractive layer LL1 and an upper refractive layer LL2 of the lens layer LP, are sequentially stacked on the second foundation layer FL-1 in order. When the second foundation layer FL-1 is the second base layer BL, the lower refractive layer LL1 and the upper refractive layer LL2 may be provided or formed in reverse order. In an embodiment, for example, the upper refractive layer LL2 may be first provided or formed on the second foundation layer FL-1, and thereafter, the lower refractive layer LL1 may be provided or formed on the upper refractive layer LL2.

The lens layer LP may be provided or formed through photolithography. Referring to FIG. 8C, a photoresist may be employed to provide or form a preliminary refractive material layer LL1-P on the second foundation layer FL-1. A mask MK may be provided on the preliminary refractive material layer LL1-P, and then light (indicated by "L") may be utilized to pattern the preliminary refractive material layer LL1-P and provide the lower refractive layer LL1.

Referring to FIG. 8E, a polymer resin may be provided on the lower refractive layer LL1, thereby providing or forming the upper refractive layer LL2 on the lower refractive layer LL1. The formation sequence of the lower refractive layer LL1 and the upper refractive layer LL2 may be changed based on what layer provides the second foundation layer FL-1.

The lower refractive layer LL1 may be provided or formed to include a plurality of protrusions PP (see FIG. 4B) that are spaced apart from each other along the first direction DR1, and are elongated along the second direction DR2 that intersects the first direction DR1. In an embodiment, for example, each of the plurality of protrusions PP may be provided or formed elongated along the second direction DR2 intersecting the first direction DR1 as the extending direction of the plurality of wire-grid patterns WGP included in the polarization layer POL.

Figure 8F:
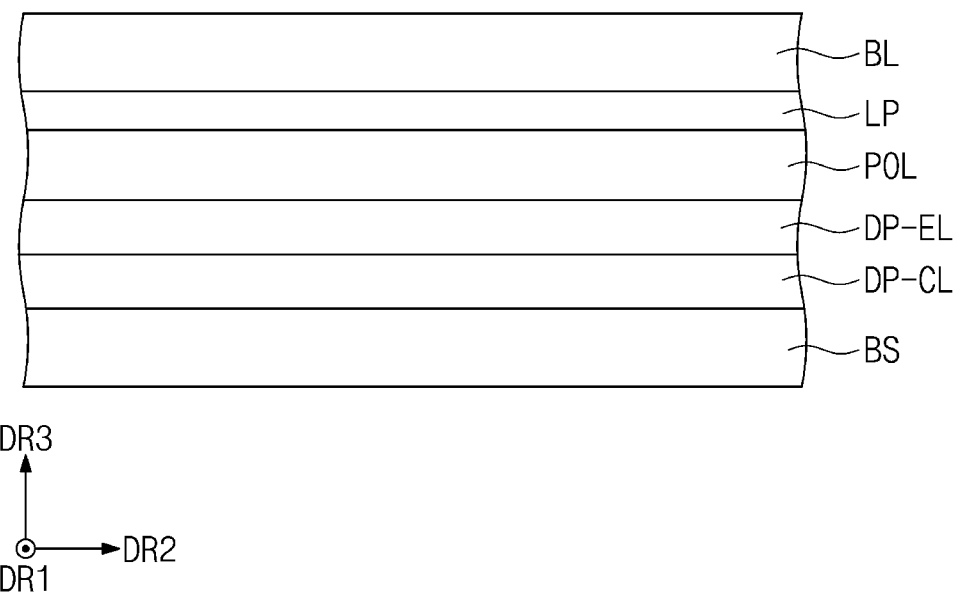

Referring to FIG. 8F, the display panel fabrication method may include combining the first base layer BS and the second base layer BL to face each other and provide the display layer DP-EL, the polarization layer POL and the lens layer LP therebetween. In the display panel fabrication method, the polarization layer POL for light polarization and the lens layer LP for visibility improvement may be provided or formed between the first base layer BS and the second base layer BL, or provided or formed to be embedded in the display panel DP, which may result in a simplification in fabrication process and a reduction in fabrication cost.

According to one or more embodiment, since a polarization layer POL and a lens layer LP for improving visibility are provided within a display panel DP, visibility may be improved and a polarizer and a lens film separate from the display panel DP may be omitted, with the result that a fabrication process may be simplified and may have reduced cost.

Although embodiments have been described with reference to a number of illustrative examples thereof, it will be understood by those of ordinary skill in the art that various changes in form and details may be made without departing from the spirit and scope of the invention as set forth in the following claims.

Thus, the technical scope of the invention is not limited by the embodiments and examples described above, but by the following claims.

What is claimed is:

1. A display panel, comprising:
   a first base layer;
   a second base layer facing the first base layer;
   an image display layer which is between the first base layer and the second base layer and provides light;
   a polarization layer which is between the image display layer and the second base layer, receives the light from the image display layer and transmits a polarized component of the light toward the second base layer, the polarization layer including a plurality of patterns extending along an extension direction and spaced apart from each other along a direction intersecting the extension direction; and
   a plurality of pattern layers which are between the polarization layer and the second base layer and have refractive indices different from each other,
   wherein the plurality of pattern layers which are between the polarization layer and the second base layer includes:
      a lower refractive layer and an upper refractive layer which face each other, the lower refractive layer having a refractive index greater than a refractive index of the upper refractive layer, and
      the lower refractive layer which has the refractive index greater than the refractive index of the upper refractive layer defining a plurality of protrusions of a lens layer which extend along the direction in which the plurality of patterns of the polarization layer are spaced apart from each other.

2. The display panel of claim 1, wherein the polarization layer includes a wire-grid polarizer.

3. The display panel of claim 1, wherein the lens layer includes in order from the first base layer to the second base layer:
   the lower refractive layer defining the plurality of protrusions protruding toward the second base layer; and
   the upper refractive layer covering the plurality of protrusions of the lower refractive layer.

4. The display panel of claim 3, wherein each of the plurality of protrusions has a rectangular shape in cross-section.

5. The display panel of claim 3, wherein each of the plurality of protrusions has a trapezoidal shape in cross-section.

6. The display panel of claim 5, wherein
   each of the plurality of protrusions has a thickness in a direction from the first base layer to the second base layer, and
   the thickness is about 10 micrometers to about 100 micrometers.

7. The display panel of claim 4, wherein
   each of the plurality of protrusions includes:

a top surface which is furthest from the first base layer and having an upper width along the first base layer, and a bottom surface which is closest to the first base layer and having a lower width along the first base layer, and each of the upper width of the top surface and the lower width of the bottom surface is about 10 micrometers to about 60 micrometers.

8. The display panel of claim 7, wherein adjacent protrusions among the plurality of protrusions include bottom surfaces spaced apart from each other by a distance, and the distance is about 5 micrometers to about 30 micrometers.

9. The display panel of claim 3, wherein the refractive index of the lower refractive layer is equal to or greater than about 1.55 and less than about 1.75, and the refractive index of the upper refractive layer is equal to or greater than about 1.20 and less than about 1.55.

10. The display panel of claim 1, wherein the image display layer includes in order from the first base layer:

a first electrode; and a second electrode facing the first electrode, the image display layer emits the light in a direction from the first electrode toward the second electrode.

11. The display panel of claim 1, further comprising a low-refractive layer facing the lens layer with the second base layer therebetween, wherein the low-refractive layer has a refractive index and the second base layer has a refractive index, and the refractive index of the low-refractive layer is less than the refractive index of the second base layer.

12. A display panel, comprising:

an image display layer which provides light;

a polarization layer including a plurality of nano-patterns extending along an extension direction and spaced apart from each other along a direction intersecting the extension direction; and a plurality of pattern layers which are on the polarization layer and have refractive indices different from each other, wherein the plurality of pattern layers includes:

a lower refractive layer and an upper refractive layer which face each other, the lower refractive layer having a refractive index greater than a refractive index of the upper refractive layer, and the lower refractive layer which has the refractive index greater than the refractive index of the upper refractive layer defining a plurality of protrusions of a lens layer which extend along the direction in which the plurality of patterns of the polarization layer are spaced apart from each other.

13. The display panel of claim 12, wherein the image display layer provides the light in a light-emitting direction, and the polarization layer and the lens layer are in order from the image display layer, in the light-emitting direction.

14. The display panel of claim 12, wherein the lens layer includes in order from the image display layer:

the lower refractive layer; and the upper refractive layer covering the lower refractive layer.

15. A method of providing a display panel, the method comprising:

providing an image display layer on a first base layer;

providing a polarization layer facing the first base layer with the image display layer therebetween, the polarization layer including a plurality of nano-patterns extending along an extension direction and spaced apart from each other along a direction intersecting the extension direction;

providing a plurality of pattern layers which are on the polarization layer and have refractive indices different from each other, the plurality of pattern layers including a lower refractive layer and an upper refractive layer which face each other, the lower refractive layer having a refractive index greater than a refractive index of the upper refractive layer; and providing the lower refractive layer which has the refractive index greater than the refractive index of the upper refractive layer defining a plurality of protrusions of a lens layer which extend along the direction in which the plurality of patterns of the polarization layer are spaced apart from each other.

16. The method of claim 15, wherein the providing the lens layer includes providing in order from the first base layer:

the lower refractive layer defining the plurality of protrusions protruding in a direction away from the first base layer; and the upper refractive layer covering the lower refractive layer.

17. The method of claim 15, wherein the providing the lens layer includes providing a second base layer facing the polarization layer with the lens layer therebetween, and the lens layer and the polarization layer are between the first base layer and the second base layer.

* * * * *